Figure 1:
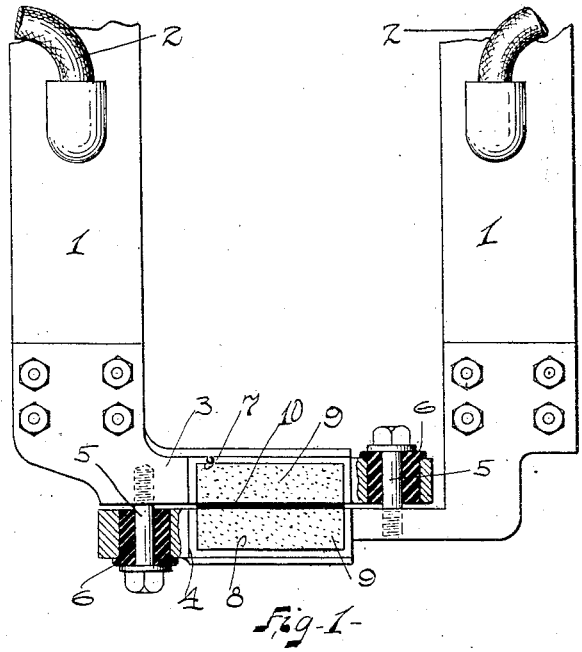

W. B. CLEVELAND.
METHOD OF ELECTRIC WELDING AND APPARATUS FOR USE THEREIN.
APPLICATION FILED SEPT. 5, 1913.

1,160,261.  Patented Nov. 16, 1915.

Witnesses
Oliver M. Kappler
Christine E. Arms

Inventor
William B. Cleveland
By Fay & Oberlin
Attorneys

UNITED STATES PATENT OFFICE.

WILLIAM B. CLEVELAND, OF BURTON, OHIO, ASSIGNOR TO THE ELECTRIC RAILWAY IMPROVEMENT COMPANY, OF CLEVELAND, OHIO, A CORPORATION OF OHIO.

METHOD OF ELECTRIC WELDING AND APPARATUS FOR USE THEREIN.

1,160,261.  Specification of Letters Patent.  Patented Nov. 16, 1915.

Original application filed October 16, 1909, Serial No. 522,921. Divided and this application filed September 5, 1913. Serial No. 738,315.

*To all whom it may concern:*

Be it known that I, WILLIAM B. CLEVELAND, a citizen of the United States, and a resident of Burton, county of Geauga, and State of Ohio, have invented a new and useful Improvement in Methods of Electric Welding and Apparatus for Use Therein, of which the following is a specification, the principle of the invention being herein explained and the best mode in which I have contemplated applying that principle, so as to distinguish it from other inventions.

This present specification is a divisional case, having been originally presented as a part of my co-pending application, Serial No. 522,921, filed October 16, 1909.

The electrode constituting a feature of the present invention is designed more particularly for use in connection with clamping and heating devices for welding or brazing bonds onto rails and particularly for use in the so-called "Herrick" process of making a homogeneous mechanical juncture, which may be found described in U. S. Letters Patent No. 1,012,077, to Albert B. Herrick dated Dec. 19, 1911, whereby such "bonding" is now satisfactorily accomplished with the aid of the electric current. In carrying out such Herrick process, it has been usual, heretofore, to employ the rail being bonded to a greater or less extent as a part of the return circuit for the electric current employed in the operation. It is not always convenient or possible, especially in construction work, to utilize the above preferred arrangement, and in such case it may become desirable to avoid use of the rails altogether, even to a limited extent as a part of the return circuit. The present electrode, then, is designed for the production, electrically, of an intense source of heat for use in carrying on the Herrick process, or other analogous welding processes, while confining the path of the current almost entirely to such electrode.
To the accomplishment of this and related ends, said invention consists of the steps and means hereinafter fully described and particularly pointed out in the claims.

The annexed drawing and the following description set forth in detail certain mechanism embodying the invention, such disclosed means constituting, however, but one of the various mechanical forms in which the principle of the invention may be used, the co-pending case previously referred to illustrating another form of apparatus that is adapted for use in a similar way.

Figure 2:
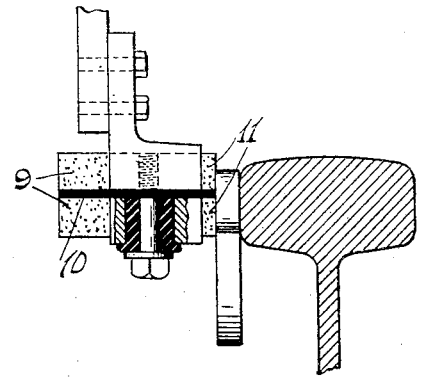
Figure 3:
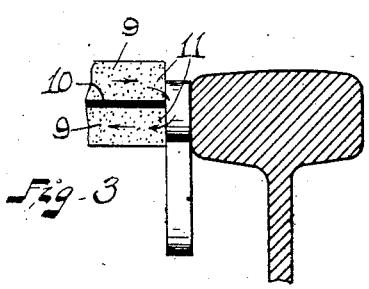

In said annexed drawing:—Figure 1 is a front elevational view of one form of electrode embodying my several improvements;
Fig. 2 is a side elevation thereof; and Fig. 3 is a diagrammatic representation of the method or process involved in using such electrode in the welding of a bond to a rail.

Referring to the form of apparatus illustrated in Figs. 1 and 2, it will be seen that the electrode proper is supported by two depending arms 1, the upper ends of which are suitably secured to a movable support (not shown) such as that afforded by a truck or the like, as will be readily understood. Said supporting arms, however, are insulated from each other and provided with independent electrical connections 2, whereby they may be included in series in an electrical circuit. Secured to the lower ends of the respective arms, are two complementary clamp members 3, 4, adapted to be drawn together by means of clamp bolts 5, which however, are fitted with bushings 6 of insulation so as to maintain the electrically separate character of the two arms. Held between said clamp members in recesses 7, 8 provided for the purpose is the electrode proper, comprising two similar blocks 9 of a material having a high resistance, such for example as carbon separated from each other by a heat resisting insulating material 10, such for example, as a thin layer of fireclay. Said blocks have their forward faces 11 contiguously disposed, and so formed as to fit the bond terminal or other body upon which it is desired to operate.

Obviously, however, current cannot flow through said electrode until its two portions are both brought into contact with the body in question. Thereupon the circuit is completed through said body as shown in Fig. 3, and the flow of current through the carbon blocks will quickly serve to bring the contacting faces of the latter to a state of incandescence such as is necessary to effect the welding or brazing, the consummation of which is the object desired.

The two blocks, despite their electrical separation, may be regarded in certain respects, as an integral structure, and may be adjusted forwardly as their front faces wear away, in the same fashion as the block illustrated in U. S. Letters Patent No. 1,045,948, to myself and William E. Huber dated Dec. 31, 1912. In the present construction as in the one there described, the space left between the clamp members is less than the depth of the block or electrode, so that the block may be clamped between them with any desired degree of pressure.

By means of the foregoing construction of electrode I provide electrically a source of heat that may be handled much as a torch or blow pipe in the manner in which it may be brought up to the body to be operated upon. It will be understood that were an integral block of carbon simply interposed in the circuit, it would be difficult to raise the exterior surface thereof, designed for contact with the bond, to the necessary temperature. By using, however, two separate carbons and bridging the current from one to the other through the contacting bond face in the manner described, the contiguously disposed contact faces of both are readily maintained in desired incandescent state.

Other modes of applying the principle of my invention may be employed instead of the one explained, change being made as regards the steps and mechanism herein disclosed, provided the steps or means stated by any of the following claims or the equivalent of such stated steps or means be employed.

I therefore particularly point out and distinctly claim as my invention:—

1. In mechanism of the class described, the combination of supporting means, two blocks of high resistance material carried thereby but insulated from each other, and independent electrical connections for said blocks, said blocks having contiguously disposed faces adapted simultaneously to contact with the body being operated upon, and being adapted to produce a high temperature upon the passage of a heating electric current therethrough.

2. In mechanism of the class described, the combination of supporting means including clamp members, two blocks of high resistance material held between said clamp members, said blocks being electrically separated from each other but having contiguously disposed faces adapted simultaneously to contact with the body being operated upon, and independent electrical connections for said clamp members.

3. In mechanism of the class described, the combination of two supporting arms insulated from each other, a block of high resistance material secured to each of said arms, said blocks having contiguously disposed faces adapted simultaneously to contact with the body being operated upon, and being adapted to produce a high temperature upon the passage of a heating electric current therethrough, and independent electrical connections for said arms.

4. In mechanism of the class described, the combination of two supporting arms provided with complementary clamp members; two blocks of high resistance material held between said clamp members so as in effect to be secured to each of said arms, said blocks having contiguously disposed faces adapted simultaneously to contact with the body being operated upon and being adapted to produce a high temperature upon the passage of a heating current therethrough; and independent electrical connections for said blocks.

5. In mechanism of the class described, the combination of two supporting arms provided with complementary clamp members; means adapted to draw said clamp members together; two blocks of high resistance material held between said clamp members and in electrical contact therewith, respectively, said blocks having contiguously disposed faces adapted to contact with the body being operated upon and being adapted to produce a high temperature upon the passage of a heating current therethrough; insulating material interposed between said blocks; and independent electrical connections for said blocks.

6. In mechanism of the class described, the combination of two depending supporting arms each provided with an inturned clamp member complementary to the other; means adapted to draw said clamp members together; two blocks of high resistance material held between said clamp members and in electrical contact therewith, respectively, said blocks having contiguously disposed faces adapted to contact with the body being operated upon and being adapted to produce a high temperature upon the passage of a heating current therethrough; insulating material interposed between said blocks; and independent electrical connections for said blocks.

7. In mechanism of the class described, the combination of supporting means; two blocks of high resistance material carried thereby, said blocks being electrically separated from each other but having contiguously disposed faces adapted simultaneously to contact with the body being operated upon, said blocks also being adjustable in said supporting means transversely of such contact faces; and independent electrical connections for said blocks.

8. In mechanism of the class described, the combination of two supporting arms provided with complementary clamp members; two blocks of high resistance material held between said clamp members so as in effect to be secured to each of said arms, said blocks having contiguously disposed faces adapted simultaneously to contact with the body being operated upon and being adapted to produce a high temperature upon the passage of a heating current therethrough, said blocks also being adjustable in said clamp members transversely of such contact faces; and independent electrical connections for said blocks.

9. In mechanism of the class described, the combination of two supporting arms provided with complementary clamp members; means adapted to draw said clamp members together; two blocks of high resistance material held between said clamp members and in electrical contact therewith, respectively, said blocks having contiguously disposed faces adapted to contact with the body being operated upon and being adapted to produce a high temperature upon the passage of a heating current therethrough; insulating material interposed between said blocks, the latter being adjustable in said clamp members transversely of such contact faces; and independent electrical connections for said blocks.

10. In a method of the character described, the steps which consist in pressing against the metallic body to be heated two heating electrodes having contiguously disposed faces adapted simultaneously to contact with such body, and thereupon passing a heating electric current through one such electrode, said body and the other such electrode in series until a high temperature is produced in the latter.

11. The method of homogeneously uniting one metal body to another, which consists in holding said bodies in contact at the desired point of union and directly heating one of said bodies by pressing against the same two electrodes of high resistance having contiguously disposed faces adapted simultaneously to contact with such body, and thereupon passing a heating electric current through one such electrode, said body and the other such electrode in series until a high temperature is produced, whereby such body and the contacting face of the second body are brought to a welding temperature practically simultaneously, substantially as described.

Signed by me this 4th day of September, 1913.

WILLIAM B. CLEVELAND.

Attested by—
D. T. DAVIES,
MARY GLADWELL.